United States Patent
Oshima

(10) Patent No.: US 7,236,945 B2
(45) Date of Patent: Jun. 26, 2007

(54) INFORMATION TRADING METHOD, INFORMATION TRADING SYSTEM AND COMPUTER READABLE RECORDING MEDIUM RECORDED WITH INFORMATION TRADING PROGRAM

(75) Inventor: Masaaki Oshima, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 09/791,876

(22) Filed: Feb. 26, 2001

(65) Prior Publication Data

US 2002/0046126 A1    Apr. 18, 2002

(30) Foreign Application Priority Data

Oct. 13, 2000    (JP)   ............... 2000-312858

(51) Int. Cl.
*G06Q 30/00*    (2006.01)

(52) U.S. Cl. .......................................... 705/26; 705/37

(58) Field of Classification Search .................... 705/1, 705/14, 26, 27, 35, 37, 39, 40
See application file for complete search history.

(56) References Cited

U.S. PATENT DOCUMENTS 6,199,164 B1 * 3/2001 Nishimoto et al. ......... 713/200
6,658,568 B1 * 12/2003 Ginter et al. ............... 713/193
7,020,632 B1 * 3/2006 Kohls et al. .................. 705/37

FOREIGN PATENT DOCUMENTS

| JP | 07-177494 | 7/1995 |
| JP | 09/107420 | 4/1997 |
| JP | 2002147518 | * 5/2002 |

OTHER PUBLICATIONS

Steve Outing, market Your Work in Virtual places, Writer's digest, vol. 80, No. 7, Jul. 2000, p. 44.*
http://web.archive.org/web/1991103202139/http://www.correspondent.com/, archived Nov. 3, 1999, printed Feb. 7, 2004.*
http://web.archive.org/web/20000308231037/http://www.correspondent.com/apply.jhtml, archived Mar. 8, 2000, printed Feb. 7, 2004.*

* cited by examiner

*Primary Examiner*—Ronald Laneau
(74) *Attorney, Agent, or Firm*—Staas &Halsey LLP

(57) ABSTRACT

An information trading method and an information trading system as well as a computer readable recording medium recorded with an information trading program, capable of providing a novel information trading type including exclusive reference to information, to thereby satisfy the demands in the market.

12 Claims, 6 Drawing Sheets

FIG.3

INFORMATION REGISTERING SCREEN

40A — TITLE: [_____]

40B — SUMMARY: [_____]

40C — CONTENTS: [_____]

· TITLE AND SUMMARY ARE FREELY REFERRED TO BY EVERYONE. PLEASE SEPARATELY ENTER THE CONCRETE CONTENTS IN "CONTENTS", ACCORDINGLY.

GENRE: GENRES ARE AUTOMATICALLY SET, BASED ON THE TITLE, SUMMARY AND CONTENTS. IF YOU WANT TO FORCIBLY FIX THEM, SELECT FROM THE FOLLOWING.

40D —
- ☐ ENTERTAINMENT
- ☐ STUDY
- ☐ DAILY INFORMATION
- ☐ SPORTS
- ☐ BUSINESS
- ☐ HEALTH & BEAUTY
- ☐ AUTOMOBILE
- ☐ MONEY
- ☐ TRAVEL
- ☐ POLITICS, LAW, SOCIETY
- ☐ GOURMET & COOKING
- ☐ CULTURE & HOBBY
- ☐ INTERNET
- ☐ MOBILE
- ☐ COMPUTER
- ☐ SHOPPING
- ☐ CAREER
- ☐ HOUSE

40E — ATTRIBUTE NOTIFICATION TERM [____] UNTIL: · FAILURE OF DESIGNATION OF A NOTIFICATION TERM LEADS TO DELETION OF THE INFORMATION IN 3 MONTHS (FROM THE TIME THE INFORMATION BECOMES FREE, IN CASE OF PAY INFORMATION)

CLASSIFICATION ☐ FREE

☐ PAY [____] YEN ☐ FIXED SYSTEM (ALWAYS CONSTANT)

—— REFERRING FEE PER REFERENCE ☐ FLEXIBLE SYSTEM (VARIABLE WITH REFERENCE FREQUENCY)

—— MONOPOLIZING FEE [____] YEN (INITIAL FEE AT NO REFERENCES)

40

INFORMATION TRADING METHOD, INFORMATION TRADING SYSTEM AND COMPUTER READABLE RECORDING MEDIUM RECORDED WITH INFORMATION TRADING PROGRAM

FIELD OF THE INVENTION

The present invention relates to an information trading technique utilizing a computer network, and particularly to a technique for providing a novel information trading type.

RELATED ART OF THE INVENTION

It is well-known that various information trades are conducted in a computer network such as the Internet, through home pages and electronic mails as communication media. In this case, information referrers are permitted to nonexclusively refer to particular information set by an information provider, on condition that an information fee set by the information provider is to be paid.

Meantime, in the market, there are demands for a monopoly on information. This is, for example, the case where a person intends to monopolize information concerning a game to be shortly put on sale, so as to firstly put a guidebook of the game on the market. In this case, when the information concerning the game is provided to other consumers, the person will lose his/her advantage over them, and the affection on his/her business will be infinite. In conventional information trading systems, however, information referrers are permitted to refer to information only in a nonexclusive manner, so that the demands in the market are not satisfied.

The present invention has been carried out in view of the conventional problems as described above, and it is therefore an object of the present invention to provide an information trading technique utilizing a computer network capable of satisfying various demands in the market, by providing a novel information trading type including exclusive reference to information.

SUMMARY OF THE INVENTION

To this end, with an information trading technique according to the present invention, by using a computer network, information provided by an information provider is registered and the registered information is allowed to be referred by an information referrer at his/her request, to thereby enable to select, one of nonexclusive information reference, exclusive information reference, and purchase of the information, as an information trading type, when an information fee is transferred between the information provider and the information referrer.

According to this constitution, it is possible to select various information trading types in response to demands of information referrers when referring to information. Thus, there can be provided a novel information trading type, in addition to the nonexclusive information reference in the conventional technique, thereby enabling to respond to various demands in the market.

When setting the information fee for nonexclusive information reference, the information provider may select whichever he/she desires from a fixed system where an information fee is fixed and a flexible system where an information fee is varied corresponding to the number of referred times of information. At this time, the flexible system is preferably such that the information fee is sequentially reduced when the number of referred times of information for a predetermined period of time is less than a predetermined number, while the information fee is sequentially increased when the number of referred times of information for the predetermined period of time is equal to the predetermined number or more.

According to this constitution, when the information fee is placed in the flexible system, the information fee for the nonexclusive information reference is varied corresponding to the number of referred times of information, which number is regarded as reflecting the market value of the information. Thus, the information fee can be optimized. Namely, the value of the information can be regarded to be low, when the number of referred times of information for the predetermined period of time is less than the predetermined number. Contrary, the value of the information can be regarded to be high, when the number of referred times of information for the predetermined period of time is equal to the predetermined number or more. By increasing or decreasing the information fee corresponding to the value of the information, the information fee set by the information provider is converged on a price corresponding to the needs in the market.

Further, the information fee for the exclusive information reference may be increased or decreased corresponding to the number of referred times and an averaged referring fee per reference for a predetermined period of time.

According to this constitution, the information fee can be optimized similarly to the aforementioned nonexclusive information fee.

Additionally, the information provider may accept claim information concerning the information referred to by the information referrer, to pay an information fee as a reward to the information referrer who has provided the claim information.

According to this constitution, claim information will be provided by information referrer when the referred information is false, so that uncertain information can be eliminated to thereby improve reliability. At this time, the information fee as a reward is paid to the information referrer, thereby optimizing the information fee.

Other objects and aspects of the present invention will become more apparent from the following description of a preferred embodiment when read in conjunction with the accompanying drawings.

BRIEF EXPLANATION OF THE DRAWINGS

FIG. 3 is an explanatory view of an information registering screen;

PREFERRED EMBODIMENT

The present invention will be described hereinafter with reference to the accompanying drawings.

Figure 1:
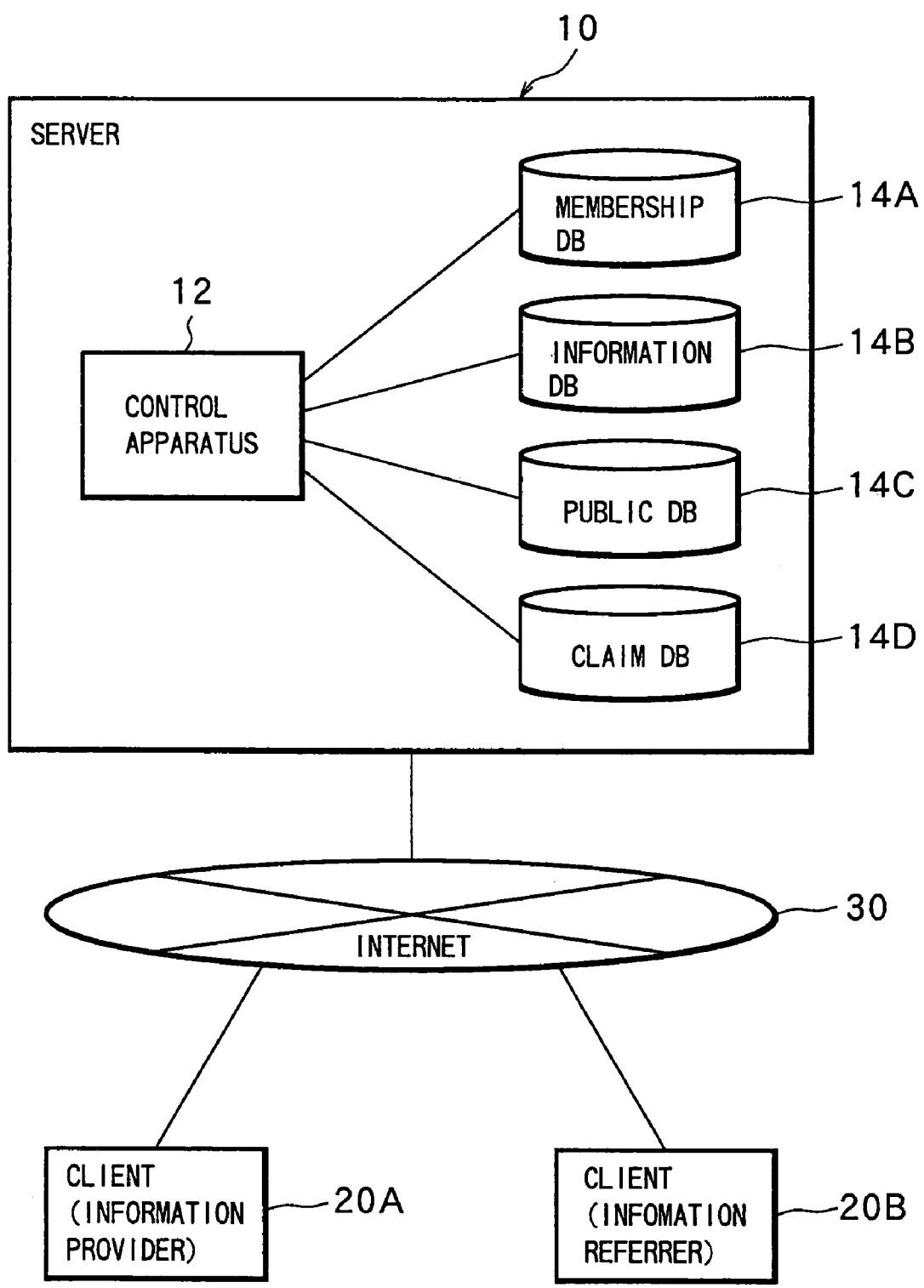
FIG. 1 is constitutional view of an information trading system according to the present invention.

FIG. 1 shows an information trading system realizing, utilizing a computer system, an information trading technique using a computer network according to the present invention.

The information trading system comprises a server 10 and at least one client 20 (20A, 20B). The server 10 and client 20 (20A, 20B) are connected to each other via Internet 30.

The server 10 comprises a control apparatus 12 consisting of a computer having at least a CPU and a memory, a membership DB (Database) 14A, an information DB 14B, a public DB 14C and a claim DB 14D. In the control apparatus 12, various functions concerning information trade are realized by a software according to a program loaded to the memory. The membership DB 14A is registered with various information concerning an information provider and/or an information referrer. The information DB 14B is registered with information provided by the information provider and accompanying information of the provided information. The public DB 14C is registered with a referenced state by information referrers, for each information registered in the information DB 14B. The claim DB 14D is registered with claim information concerning the information registered in the information DB 14B.

The server 10 realizes information fee setting means, an information fee setting function, referring type designating means, a referring type designating function, information fee transferring means and an information fee transferring function.

The client 20 (20A, 20B) is constituted of a computer having a displaying part such as a CRT (Cathode Ray Tube) or an LCD (Liquid Crystal Display), and an inputting part such as a keyboard and a mouse. Further, the client 20 (20A, 20B) is installed with a browser (browsing program) for browsing an information trading service site and with an electronic mail program.

There will be described hereinafter information trading service adopting the information trading system having the aforementioned constitution.

It is necessary for each information provider to conduct membership registration, before registering information (hereinafter called "offered information") as a trade subject. Namely, each information provider connects his/her client 20A to the server 10 via Internet 30. Further, in a membership registration screen (not shown), after the information provider has set a membership ID and a password for user authentication, the membership ID and password are registered in the membership DB 14A. At this time, the membership DB 14A is registered, for example, with: the balance of an account through which transference of an information fee is conducted; the number of registered information; and the number of referring times of information; at their initial states (i.e., the account balance=¥0, the number of registered information=0, and the number of referring times of information=0).

Figure 2:
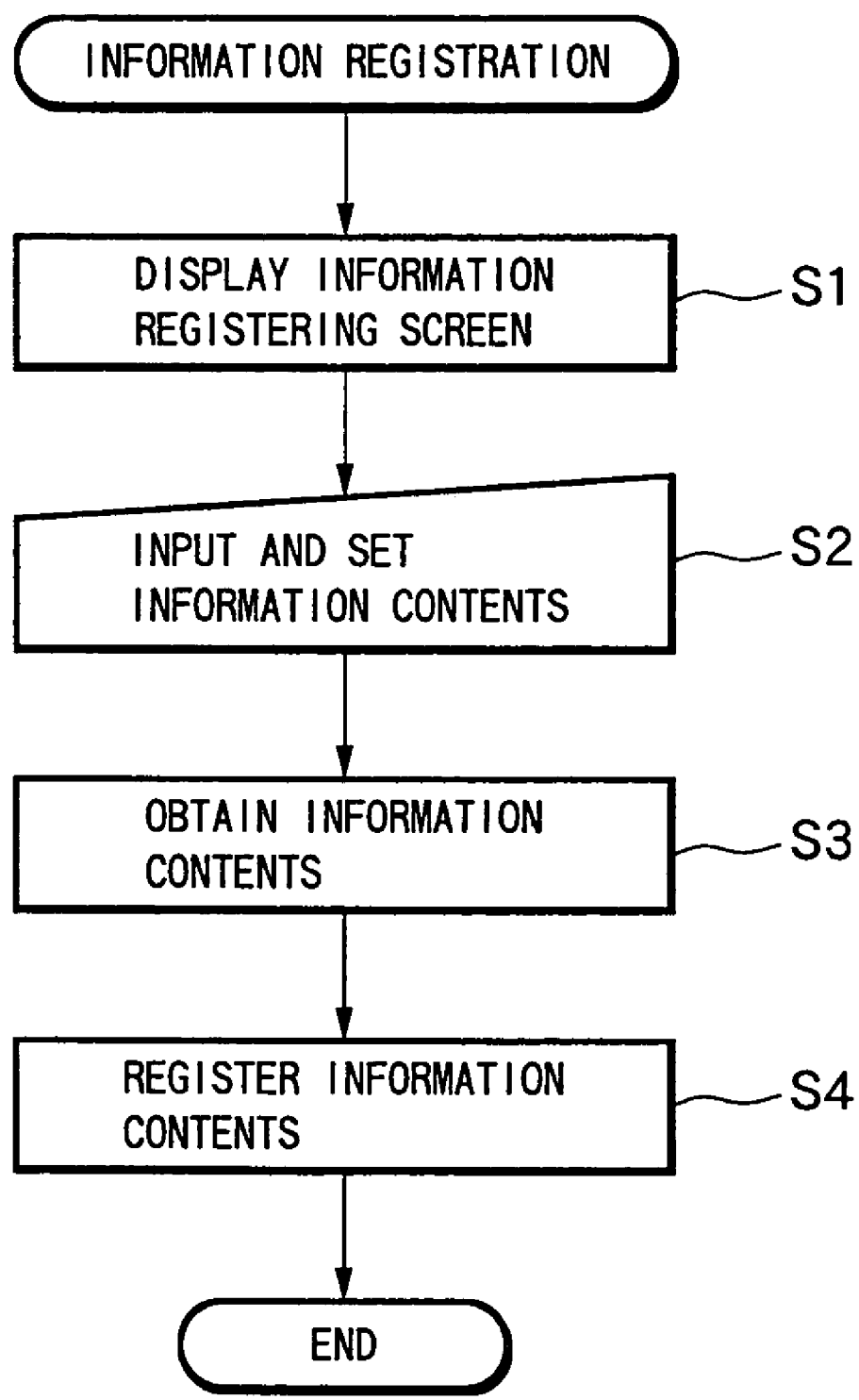
FIG. 2 is a flowchart showing an information registering process.

When each information provider is to register his/her offered information, the information provider has to connect his/her client 20A to the server 10 via Internet 30, and to input his/her membership ID and password for user authentication. When the user authentication is OK, the information provider is judged to have been registered as a member, leading to execution of an information registering process as shown in FIG. 2. Contrary, when the user authentication is NG, a screen for promoting membership registration, for example, may be displayed. The reason why the user authentication is required when conducting information registration is that an account balance is required to be updated for each information provider.

At step 1 (abbreviated to "S1" in FIG. 2; and the same rule applies corresponding to the following) in a flowchart showing the information registering process, an information registering screen 40 as shown in FIG. 3 is displayed. The information registering screen 40 is constituted to include a title input area 40A, a summary input area 40B, a content input area 40C, a genre setting area 40D and an attribute setting area 40E. At the title input area 40A, summary input area 40B and content input area 40C, a title, a summary and a concrete content concerning the offered information are input, respectively. At the genre setting area 40D, genres functioning as keywords are set for facilitating information search by the information referrer. At the attribute setting area 40E, there are set attributes concerning the offered information, i.e., an information offering period of time, and classification (differentiation between free information and pay information). Where the offered information is pay information, a referring fee per reference (inclusive of differentiation between a fixed system and a flexible system) and a monopolizing fee are also set.

At step 2, the title, summary, content, genre and attribute concerning the offered information (hereinafter collectively called "information contents") are input or set by the information provider. The process at step 2 realizes information fee setting means and an information fee setting function.

At step 3, the information contents are obtained via the information registering screen 40.

At step 4, the obtained information contents and the accompanying information thereof are registered in the information DB 14B and public DB 14C. Namely, the information DB 14B is registered with the membership ID, an information serial number, a registration date, the title, the summary, the content, the referring fee, the monopolizing fee and the like, while the public DB 14C is registered with the information serial number, the registration date, the number of referred times, a monopoly period of time and the number of claims. Here, the number of referred times, the monopoly period of time and the number of claims are registered at initial states thereof (the number of referred times=0, the monopoly period of time=undefined, and the number of claims=0).

According to the process through steps 1 to 4 as described above, when the information provider inputs or sets the information contents via the information registering screen 40, the information contents and the accompanying information thereof are registered in the information DB 14B and public DB 14C. As a result, information referrers are permitted to refer to the registered information.

When registering information, arbitrary keyword may be registered for the expediency of information referrers. In this case, it is preferable that the information registration is rejected, when the information DB 14B is retrieved based on the set keyword and such information having keyword the greater part of which is common to the set keyword already exists in the information DB 14B. In this way, there is avoided registration of overlapped information to thereby prevent information referrers from referring to needless information.

Figure 4:
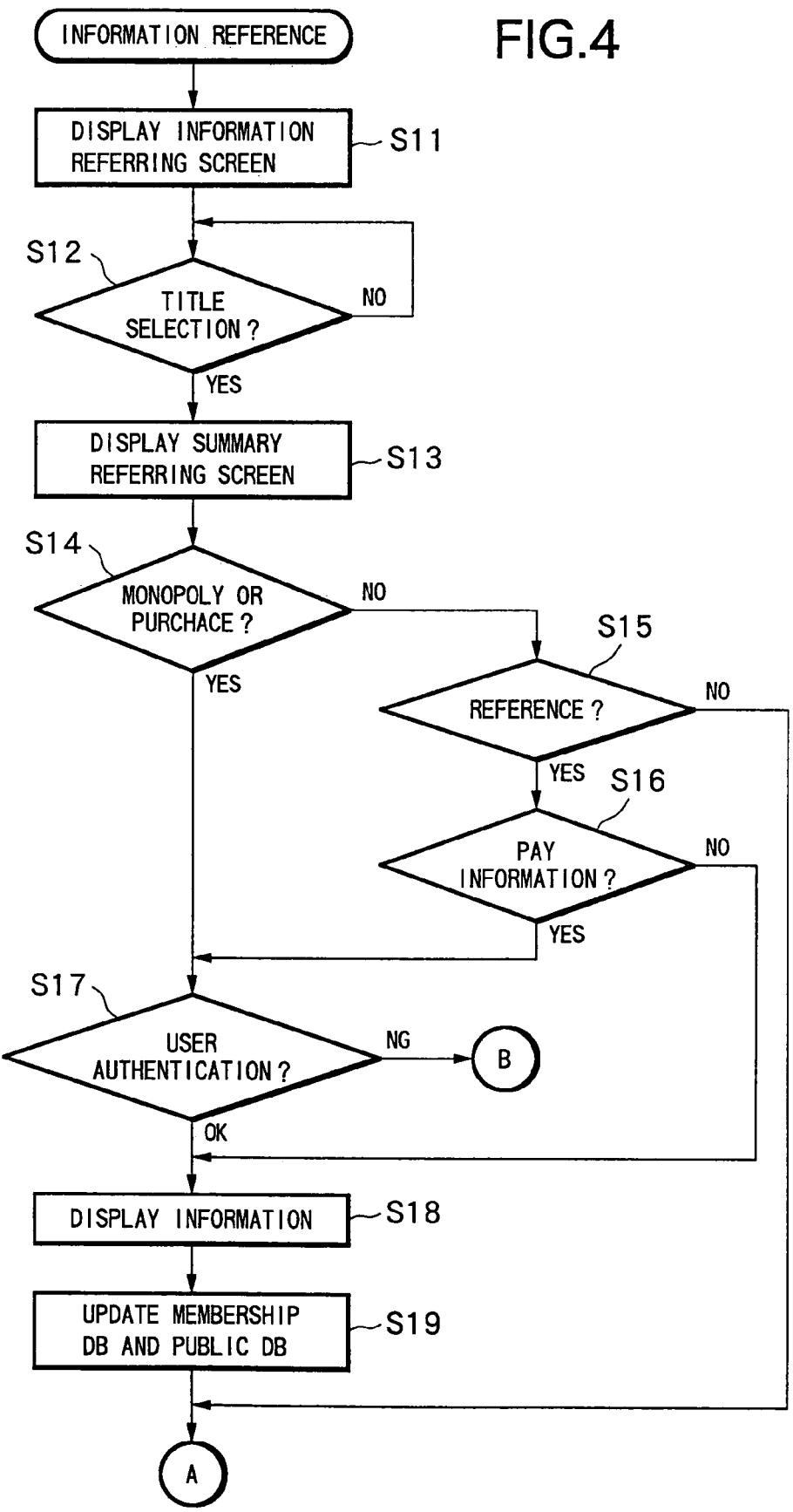
FIG. 4 is a flowchart showing an information referring process.
Figure 5:
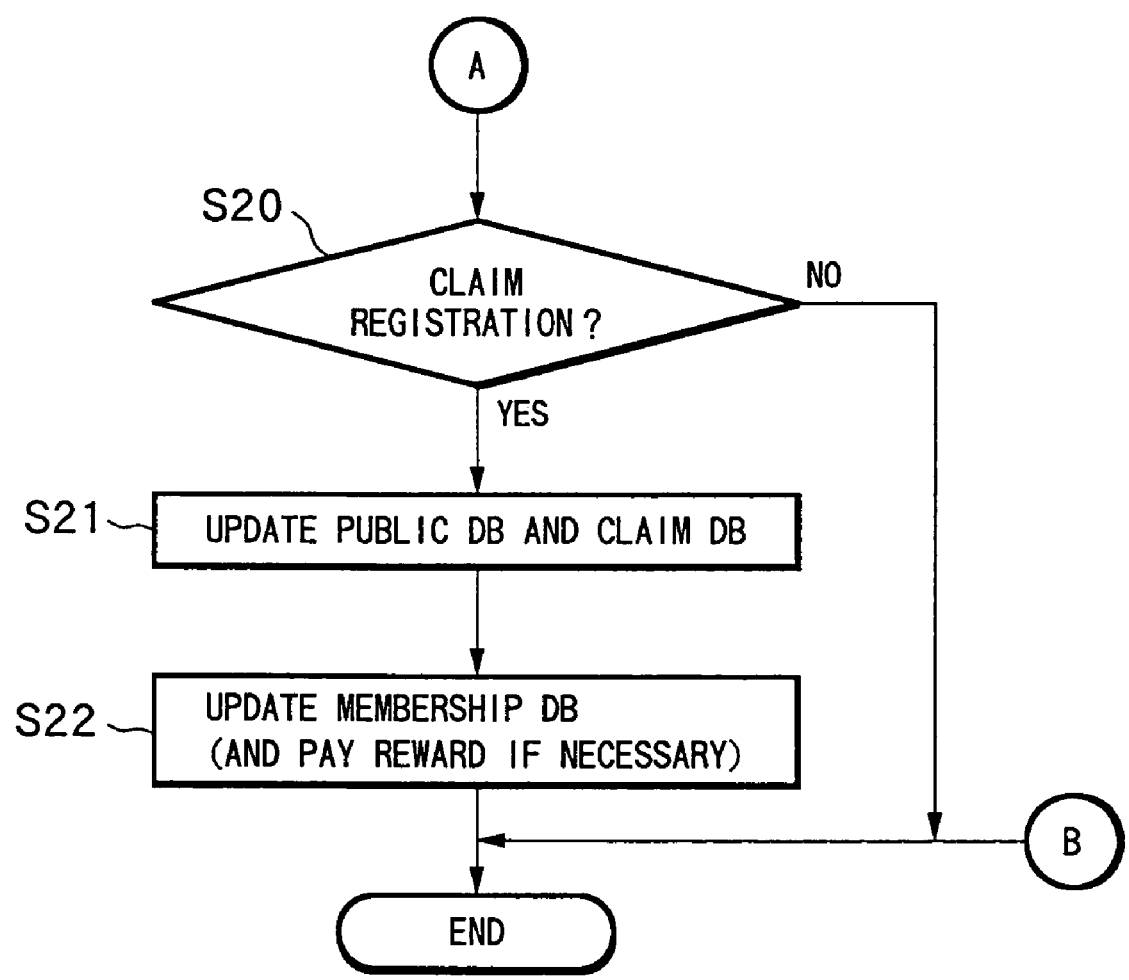
FIG. 5 is a flowchart showing the information referring process.

When the offered information is referred to by the information referrer, the client 20B is connected to the server 10 via Internet 30, and information trade is conducted according to an information referring process shown in FIGS. 4 and 5. Note, when an information referrer is to conduct an information reference involving transference of an information fee, the information referrer has to previously conduct membership registration and to duly update the account balance to be registered in the membership DB 14A such as by cash deposition or a credit card.

Figure 6:
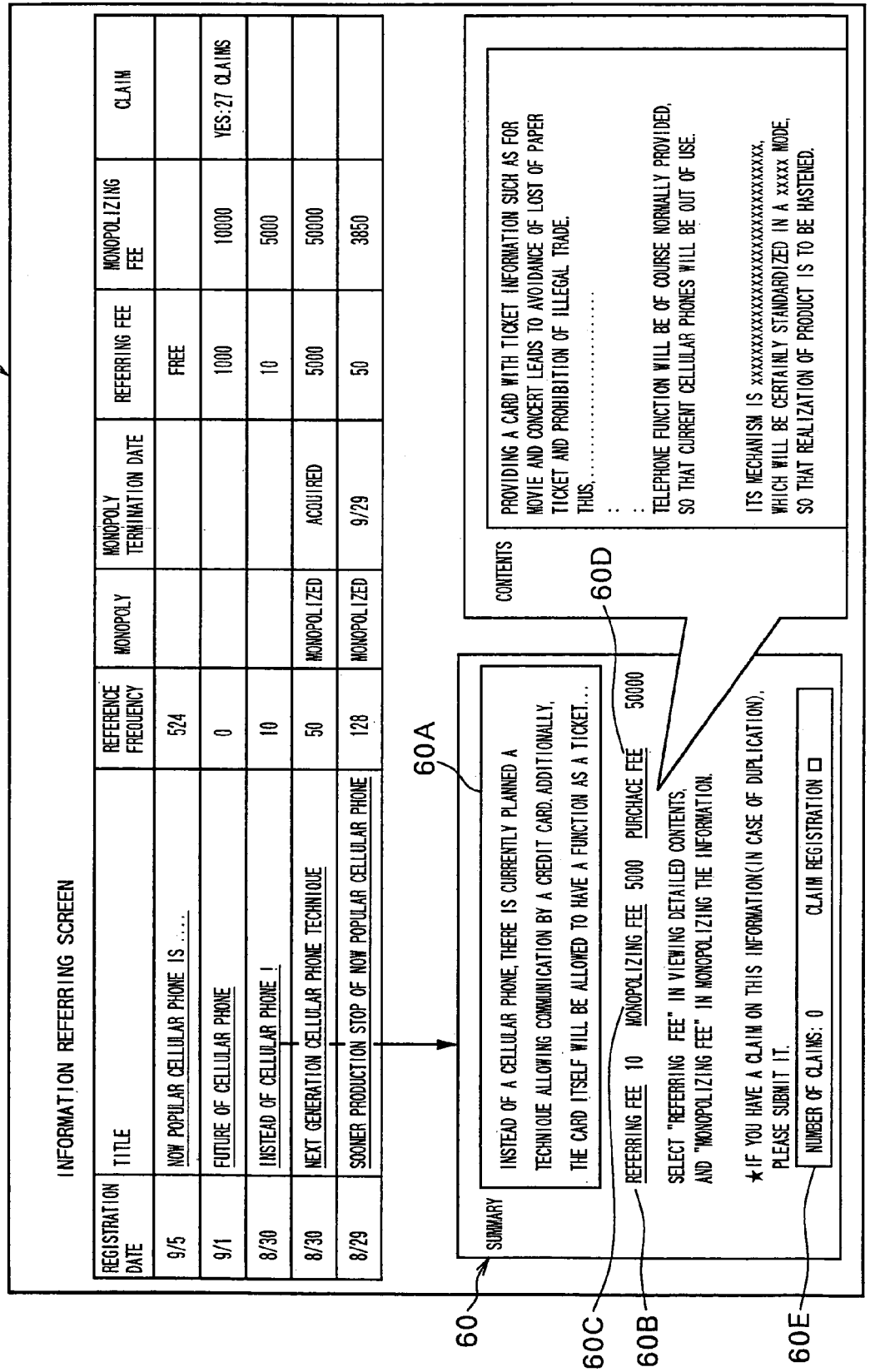
FIG. 6 is an explanatory view of an information referring screen.

At step 11 in a flowchart showing the information referring process, an information referring screen 50 as shown in FIG. 6 is displayed. The information referring screen 50 at its initial state shows information registered in the information DB 14B and public DB 14C in a table format. Namely, there are displayed, for each information, its registration date, title, number of referred times, monopolized state, monopoly termination date (inclusive of purchase), referring fee, monopolizing fee, and number of claims.

Here, the monopoly termination date is calculated based on the monopoly period of time registered in the public DB 14C.

Further, the referring fee is calculated based on the attribute set via the attribute setting area 40E of the information registering screen 40 (see FIG. 3). Namely, when the referring fee per reference has been placed in the fixed system, the fee (hereinafter called "set fee") set by the information provider is displayed as it is. Contrary, when the referring fee per reference has been placed in the flexible system, the set fee is firstly displayed, and then there is displayed a fee which is increased or reduced based on the number of referred times (inclusive of the number of monopolized times). Concretely, a duly reduced fee is displayed when the number of referred times is less than a predetermined number for a predetermined period of time, and a duly increased fee is displayed when the number of referred times is equal to the predetermined number or more for the predetermined period of time.

Further, as the monopolizing fee, the fee set by the information provider is firstly displayed, when the number of referred times is zero. Contrary, a fee calculated as follows is displayed, when the number of referred times is one or more. Namely, there are calculated the number of referred times and an averaged referring fee per reference, for the predetermined period of time. Then, there is calculated an expected number of referred times, based on the number of referred times for the predetermined period of time. Further, the monopolizing fee is obtained by multiplying the expected number of referred times by the averaged referring fee. Note, when the number of referred times is one or more, the monopolizing fee may be discounted corresponding to the number of referred times, because the monopolization value is considered to have been reduced in such a situation.

At step 12, it is judged whether or not the title has been selected, i.e., whether or not the summary of information is to be displayed. If the title has been selected (Yes), the flow goes to step 13. If not (No), the process at step 12 is repeatedly executed.

At step 13, a summary information displaying screen 60 is displayed, which is constituted to include a summary displaying area 60A, a referring fee displaying area 60B, a monopolizing fee displaying area 60C, an purchase fee displaying area 60D and a claim registering area 60E. Here, in the purchase fee displaying area 60D, a fee in case of purchasing the information, such as obtained by multiplying the monopolizing fee by a predetermined number, is displayed. The purchase fee may be set in the information registering screen 40 (see FIG. 3).

At step 14, it is judged whether the information is to be monopolized or purchased, i.e., whether the monopolizing fee displaying area 60C or the purchase fee displaying area 60D has been clicked. The flow advances to step 17 when the information is to be monopolized or purchased (Yes), or to step 15 when the information is not to be monopolized nor purchased (No).

At step 15, it is judged whether or not the information is to be referred to, i.e., whether or not the referring fee displaying area 60B has been clicked. The flow advances to step 16 when the information is to be referred to (Yes), or to step 20 when the information is not to be referred to (No).

The process at steps 14 and 15 realizes referring type designating means and a referring type designating function.

At step 16, it is judged whether or not the information to be referred to is pay information. Namely, this is done by referring to the referring fee registered in the information DB 14B. The flow advances to step 17 if it is pay information (Yes), or to step 18 if it is free information (referring fee=¥0) (No).

At step 17, there is conducted user authentication for the information referrer, since transference of the information fee is involved in the monopoly or purchase of the information or in the reference to the pay information. Further, the flow advances to step 18 when the user authentication is OK. Contrary, when the user authentication is NG, the information referring process is terminated, such as by displaying a screen which promotes membership registration.

At step 18, the information content is displayed. Namely, the content concerning the offered information registered in the information DB 14B is displayed, when the referring fee displaying area 60B or purchase fee displaying area 60D of the summary information displaying screen 60 has been clicked (in case of nonexclusively referring to the information or purchasing it). Further, when the monopolizing fee displaying area 60C of the summary information displaying screen 60 has been clicked (in case of exclusively referring to the information), there is displayed a monopoly period designating screen (not shown). When a desired monopoly period of time is designated on the monopoly period designating screen, the monopolizing fee calculated based on the determining procedure of the monopolizing fee as described with reference to step 11 is displayed. When an agreement is to be given to the displayed monopolizing fee, the information content can be exclusively referred to, for example, by pressing an "OK" button. Contrary, when no agreement is to be given to the displayed monopolizing fee, it is possible to terminate the exclusive information-referring process, for example, by pressing a "Cancel" button.

At step 19, the membership DB 14A and public DB 14C are updated. Namely, in case of the exclusive reference to or purchase of the information, or in case of the reference to the pay information, the account balance and the number of referring times in the membership DB 14A are updated, as well as the number of referred times and the monopoly period of time (in case of exclusive reference and purchase) in the public DB 14C. At this time, the information fee accompanying to the information reference by the information referrer is transferred to the account balance of the information provider in the membership DB 14A. Contrary, in case of reference to free information, only the number of referred times in the public DB 14C is updated. Note, the process at step 19 realizes information fee transferring means and an information fee transferring function.

At step 20, it is judged whether or not a claim registering operation has been conducted in the summary information displaying screen 60. The flow advances to step 21 when the claim registering operation has been conducted (Yes), while the information referring process is terminated when no claim registering operations have been conducted (No).

At step 21, the number of claims in the public DB 14C are updated, and the information serial number, registration date, claim serial number and claim contents in the claim DB 14D are also updated.

At step 22, the account balance of the information referrer who has conducted the claim registration in the membership DB 14A is updated, so that an information fee as a reward is paid to the information referrer.

According to the process at steps 11 through 22 as described above, when clicking a title of due information displayed in the list format in the information referring screen 50, its summary is displayed. Thus, the information referrer is possible to know the summary of the information which can be hardly understood from the title only, to judge whether the information content is to be referred to. Further, when clicking any of the referring fee displaying area 60B, monopolizing fee displaying area 60C and purchase fee displaying area 60D in accordance with an information trading type desired by the information referrer, the content of the information is displayed and the information fee is charged to the account of the information referrer (except for reference to free information). At this time, the referring fee and the monopolizing fee based on the flexible system are varied corresponding to the number of referred times, thereby optimizing the information fee.

A person who has presented the highest price at auction may exclusively refer to offered information, when a plurality of information referrers desire to refer to the offered information.

Further, claim registration will be conducted by information referrers when the referred information is false, so that uncertain information can be eliminated to thereby improve reliability of the information trading system. At this time, an information fee as a reward is paid to the information referrer who has conducted the claim registration, thereby optimizing the information fee.

The aforementioned information trading system has been constituted such that information is traded via a browser. However, trade of information may be conducted via an electronic mail.

Further, it is possible to set a minus information fee such as for a corporation advertisement and to pay the information fee to information referrers, to thereby constitute a novel advertising type.

By recording a program for realizing such functions into a computer-readable recording medium such as a magnetic tape, magnetic disk, magnetic drum, IC card, CD-ROM, and DVD-ROM, the information trading program according to the present invention can be distributed into the market. Further, those who have obtained such a recording medium are possible to readily construct the information trading system according to the present invention, making use of a general computer system.

What is claimed:

1. An information trading method, utilizing a computer network, the method comprising:
    registering information provided by an information provider;
    allowing an information referrer to refer to the registered information at his/her request to conduct transference of an information fee dually between an account of the information provider that is opened on a database of a server for providing information trading services and an account of the information referrer that is opened on the database of the server for providing information trading services;
    accepting, from the information provider, offered information as an offered subject, and setting of an information fee for nonexclusive information reference to said offered information of an information fee for exclusive information reference to said offered information or of an information fee of purchase of said offered information;
    accepting, from the information referrer, designation as to whether the information referrer is to nonexclusively refer to said offered information, to exclusively refer to said offered information, or to purchase said offered information provided by the information provider; and
    updating account balances of the information referrer and information provider in the database when the information fee is transferred between the information provider and the information referrer,
    wherein the registering information provided by the information provider and the referring information provided by the information referrer are respectively stored in the database of the server for providing information trading services,
    wherein, when registering information with an associated keyword, the registration of the information in the database is rejected if substantially similar keywords already exist,
    wherein the information fee for the exclusive information reference is increased or decreased corresponding to the number of referred times and an averaged referring fee per reference for a predetermined period of time, and
    wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

2. An information trading method of claim 1,
    wherein, when accepting, from the information provider, said setting of the information fee for the nonexclusive information reference to the offered information, there is accepted a selection by the information provider out of a fixed system where an information fee is fixed and a flexible system where an information fee is varied corresponding to the number of referred times of information.

3. An information trading method of claim 2,
    wherein said flexible system is constituted such that the information fee is sequentially reduced when the number of referred times of information for a predetermined period of time is less than a predetermined number, while the information fee is sequentially increased when the number of referred times of information for the predetermined period of time is equal to the predetermined number or more.

4. An information trading method of claim 1, further comprising the steps of:
    accepting claim information concerning the information referred to by the information referrer, and
    paying an information fee as a reward to the information referrer who has provided the claim information.

5. An information trading method, utilizing a computer network, the method comprising:
    registering information provided by an information provider;

allowing an information referrer to refer to the registered information at his/her request to conduct transference of an information fee dually between an account of the information provider that is opened on a database of a server for providing information trading services and an account of the information referrer that is opened on the database of the server for providing information trading services;

designating as to whether the information provided by the information provider is to be nonexclusively referred to, to be exclusively referred to, or to be purchased;

transmitting the designated content;

receiving transmitted information, corresponding to the transmitted content; and updating account balances of the information referrer and information provider in the database when the information fee is transferred between the information provider and the information referrer, wherein the registering information provided by the information provider and the referring information provided by the information referrer are respectively stored in the database of the server for providing information trading services, wherein, when registering information with an associated keyword, the registration of the information in the database is rejected if substantially similar keywords already exist, wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period, of time.

6. An information trading method, utilizing a computer network, the method comprising:

registering information provided by an information provider;

allowing an information referrer to refer to the registered information at his/her request to conduct transference of an information fee dually between an account of the information provider that is opened on a database of a server for providing information trading services and an account of the information referrer that is opened on the database of the server for providing information trading services;

setting offered information as an offered subject, and an information fee for nonexclusive information reference to said offered information, an information fee for exclusive information reference to said offered information or an information fee of purchase of said offered information;

transmitting the information and the set information fee; and updating account balances of the information referrer and information provider in the database when the information fee is transferred between the information provider and the information referrer, wherein the registering information provided by the information provider and the referring information provided by the information referrer are respectively stored in the database of the server for providing information trading services, wherein, when registering information with an associated keyword, the registration of the information in the database is rejected if substantially similar keywords already exist wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

7. An information trading system, utilizing a computer network, comprising:

an information fee setting device setting, when registering information provided by an information provider, an information fee for nonexclusive information reference, an information fee for exclusive information reference or an information fee of purchase;

a referring type designating device designating, when allowing an information referrer to refer to the registered information his/her request, as to whether the registered information is to be nonexclusively referred to, exclusively referred to, or purchased; and an information fee transferring device conducting, when allowing reference to the registered information, transference of an information fee dually between an account of the information provider that is opened on a database of a server for providing information trading services and an account of the information referrer that is opened on the database of the server for providing information trading services, wherein the registering information provided by the information provider and the referring information provided by the information referrer are respectively stored in the database of the server for providing information trading services, wherein, when registering information with an associated keyword, the registration of the information in the database is rejected if substantially similar keywords already exist, wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

8. A computer-readable recording medium recorded with an information trading program for rendering a computer to realize, using a computer network:

a information fee setting function for setting, when registering information provided by an information provider, an information fee for nonexclusive information reference, an information fee for exclusive information reference or an information fee of purchase;

a referring type designating function for designating, when allowing an information referrer to refer to the registered information his/her request, as to whether the registered information is to be nonexclusively referred to, exclusively referred to, or purchased; and an information fee transferring function for conducting, when allowing reference to the registered information, transference of an information fee dually between an account of the information provider that is opened on a database of a server for providing information trading services and an account of the information referrer that is opened on the database of the server for providing information trading services, wherein the registering information provided by the information provider and the referring information provided by the information referrer are respectively stored in the database of the server for providing information trading services, wherein, when registering information with an associated keyword, the registration of the information in the database is rejected if substantially similar keywords already exist, wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

9. An information trading, utilizing a computer network, the method comprising:

registering information provided by an information provider;

allowing an information referrer to refer to the registered information at his/her request to conduct transference of an information fee between the information provider and the information referrer on the database of a server for providing information trading services;

accepting, from the information provider, offered information as an offered subject, and setting of an information fee for nonexclusive information reference to said offered information, of an information fee for exclusive information reference to said offered information or of an information fee of purchase of said offered information;

accepting, from the information referrer, designation as to whether the information referrer is to nonexclusively refer to said offered information, to exclusively refer to said offered information, or to purchase said offered information provided by the information provider; and updating account balances of the information referrer and information provider in the database when the information fee is transferred between the information provider and the information referrer, wherein the information fee for the exclusive information reference is increased or decreased corresponding to the number of referred times and an averaged referring fee per reference for a predetermined period of time, wherein, when registering information with an associated keyword, the registration of the information in the database is rejected if substantially similar keywords already exist, wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

10. An information trading, utilizing a computer network, the method comprising:

registering information provided by an information provider;

allowing an information referrer to refer to the registered information at his/her request to conduct transference of an information fee between the information provider and the information referrer on the database of a server for providing information trading services;

accepting, from the information provider, offered information as an offered subject, and setting of an information fee for nonexclusive information reference to said offered information, of an information fee for exclusive information reference to said offered information or of an information fee of purchase of said offered information;

accepting, from the information referrer, designation as to whether the information referrer is to nonexclusively refer to said offered information, to exclusively refer to said offered information, or to purchase said offered information provided by the information provider; and updating account balances of the information referrer and information provider in the database when the information fee is transferred between the information provider and the information referrer, wherein, when accepting, from the information provider, said setting of the information fee for the nonexclusive information reference to the offered information, there is accepted a selection by the information provider out of a fixed system where an information fee is fixed and a flexible system where an information fee is varied corresponding to the number of referred times of information, wherein said flexible system is constituted such that the information fee is sequentially reduced when the number of referred times of information for a predetermined period of time is less than a predetermined number, while the information fee is sequentially increased when the number of referred times of information for the predetermined period of time is equal to the predetermined number or more, wherein, when registering information with an associated keyword, the registration of the information in the database is rejected if substantially similar keywords already exist wherein the information fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by an averaged referring fee where the expected number is based on a number of referred times during a predetermined period of time and the averaged referring fees is an average of referring fees during the predetermined period of time.

11. An information trading method, utilizing a computer network, the method comprising:

registering information provided by an information provider on a server for providing information trading services;

transferring the registered information to an information referrer; and transferring a fee for the transferred registered information from an account of the information referrer on a database of the server for providing information trading services to an account of the information provider on the database of the server for providing information trading services, wherein the fee for the exclusive information reference is increased or decreased corresponding to the number of referred times and an averaged referring fee per reference for a predetermined period of time, and wherein the fee as set by the information provider is displayed when the number of referred times is zero and when the number of referred times is greater than zero, the fee is an expected number of referred times multiplied by the averaged referring fee where the expected number is based on a number of referred times during the predetermined period of time and the averaged referring fees is an average of referring fees during the predetermined period of time.

12. The information trading method of claim 11, wherein said fee is sequentially reduced when the number of times the registered information is transferred over a predetermined period of time is less than a predetermined number, while said fee is sequentially increased when the number times the registered information is transferred over the predetermined period of time is greater than or equal to the predetermined number.

* * * * *

UNITED STATES PATENT AND TRADEMARK OFFICE
CERTIFICATE OF CORRECTION

PATENT NO. : 7,236,945 B2  Page 1 of 1
APPLICATION NO. : 09/791876
DATED : June 26, 2007
INVENTOR(S) : Masaaki Oshima It is certified that error appears in the above-identified patent and that said Letters Patent is hereby corrected as shown below:

Column 9, Line 41, change "period, of" to --period of--.

Signed and Sealed this

Twenty-fifth Day of December, 2007

JON W. DUDAS
*Director of the United States Patent and Trademark Office*